United States Patent
Zolin et al.

(10) Patent No.: US 12,462,796 B2
(45) Date of Patent: Nov. 4, 2025

(54) GENERATION OF A MAP FOR RECORDED COMMUNICATIONS

(71) Applicant: Lenovo (Singapore) Pte. Ltd., Singapore (SG)

(72) Inventors: Inna Zolin, Cary, NC (US); Matthew Fardig, Boonville, IN (US); Carl H. Seaver, Bainbridge, IN (US); Joshua Smith, Milton, FL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 429 days.

(21) Appl. No.: 17/855,142

(22) Filed: Jun. 30, 2022

(65) Prior Publication Data

US 2024/0005914 A1   Jan. 4, 2024

(51) Int. Cl.
*G10L 15/18*  (2013.01)
*G06F 40/35*  (2020.01)
*G10L 25/78*  (2013.01)

(52) U.S. Cl.
CPC .............. *G10L 15/18* (2013.01); *G06F 40/35* (2020.01); *G10L 25/78* (2013.01)

(58) Field of Classification Search
CPC ..... G10L 15/18; G10L 25/78; G10L 15/1822; H04L 67/306; H04L 12/1831; H04L 67/535; H04M 2201/38; H04M 2203/252; H04M 2203/301; H04M 2203/303; H04M 2203/552; H04M 3/42221
See application file for complete search history.

(56) References Cited

U.S. PATENT DOCUMENTS

| | | | | |
|---|---|---|---|---|
| 2015/0278192 | A1* | 10/2015 | Bretter | G10L 15/00 704/9 |
| 2020/0105269 | A1* | 4/2020 | VanBlon | G06F 16/3323 |
| 2020/0411033 | A1* | 12/2020 | Qian | G06Q 10/10 |
| 2022/0083596 | A1* | 3/2022 | Yamada | H04N 23/64 |
| 2023/0326453 | A1* | 10/2023 | Bruner | G10L 15/26 |

* cited by examiner

*Primary Examiner* — Douglas Godbold
(74) *Attorney, Agent, or Firm* — FERENCE & ASSOCIATES LLC

(57) ABSTRACT

One embodiment provides a method, the method including: obtaining, at a communication mapping system, a recorded communication occurring between at least two participants; tracking, using the communication mapping system, when a participant of the at least two participants is communicating; identifying, using the communication mapping system and while the participant is communicating, at least one topic of the recorded communication, wherein the identifying comprises tracking a time within the communication corresponding to the at least one topic; and producing, from the tracking and the at least one topic, a map for the recorded communication, wherein the map identifies topics of the recorded communication, times within the recorded communication corresponding to the topics, and times within the recorded communication corresponding to a participant communicating. Other aspects are described and claimed.

20 Claims, 3 Drawing Sheets

GENERATION OF A MAP FOR RECORDED COMMUNICATIONS

BACKGROUND

Creating a recording of a communication and/or a call between two or more people is a common business practice used by organizations and individuals alike to ascertain that the information discussed during a call was provided and will not be forgotten. A recording can be referenced at a point after completion of a call and can act as a reminder and/or foundation of required information needed to complete a task. Communications can include discussions regarding one topic or a plurality of topics. Additionally, a communication can occur with a plurality of users. Recording the communication can capture all topics and/or ideas discussed on the communication from each participant present during the communication.

BRIEF SUMMARY

In summary, one aspect provides a method, the method including: obtaining, at a communication mapping system, a recorded communication occurring between at least two participants; tracking, using the communication mapping system, when a participant of the at least two participants is communicating; identifying, using the communication mapping system and while the participant is communicating, at least one topic of the recorded communication, wherein the identifying comprises tracking a time within the communication corresponding to the at least one topic; and producing, from the tracking and the at least one topic, a map for the recorded communication, wherein the map identifies topics of the recorded communication, times within the recorded communication corresponding to the topics, and times within the recorded communication corresponding to a participant communicating.

Another aspect provides an information handling device, the information handling device including: a processor; a memory device that stores instructions that when executed by the processor, causes the information handling device to: obtain, at a communication mapping system, a recorded communication occurring between at least two participants; track, using the communication mapping system, when a participant of the at least two participants is communicating; identify, using the commination mapping system and while the participant is communicating, at least one topic of the recorded communication, wherein the identifying comprises tracking a time within the communication corresponding to the at least one topic; and produce, from the tracking and the at least one topic, a map for the recorded communication, wherein the map identifies topics of the recorded communication, times within the recorded communication corresponding to the topics, and times within the recorded communication corresponding to a participant communicating.

A further aspect provides a product, the product including: a computer-readable storage device that stores executable code that, when executed by a processor, causes the product to: obtain, at a communication mapping system, a recorded communication occurring between at least two participants; track, using the communication mapping system, when a participant of the at least two participants is communicating; identify, using the communicating mapping system and while the participant is communicating, at least one topic of the recorded communication, wherein the identifying comprises tracking a time within the communication corresponding to the at least one topic; and produce, from the tracking and the at least one topic, a map for the recorded communication, wherein the map identifies topics of the recorded communication, times within the recorded communication corresponding to the topics, and times within the recorded communication corresponding to a participant communicating.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
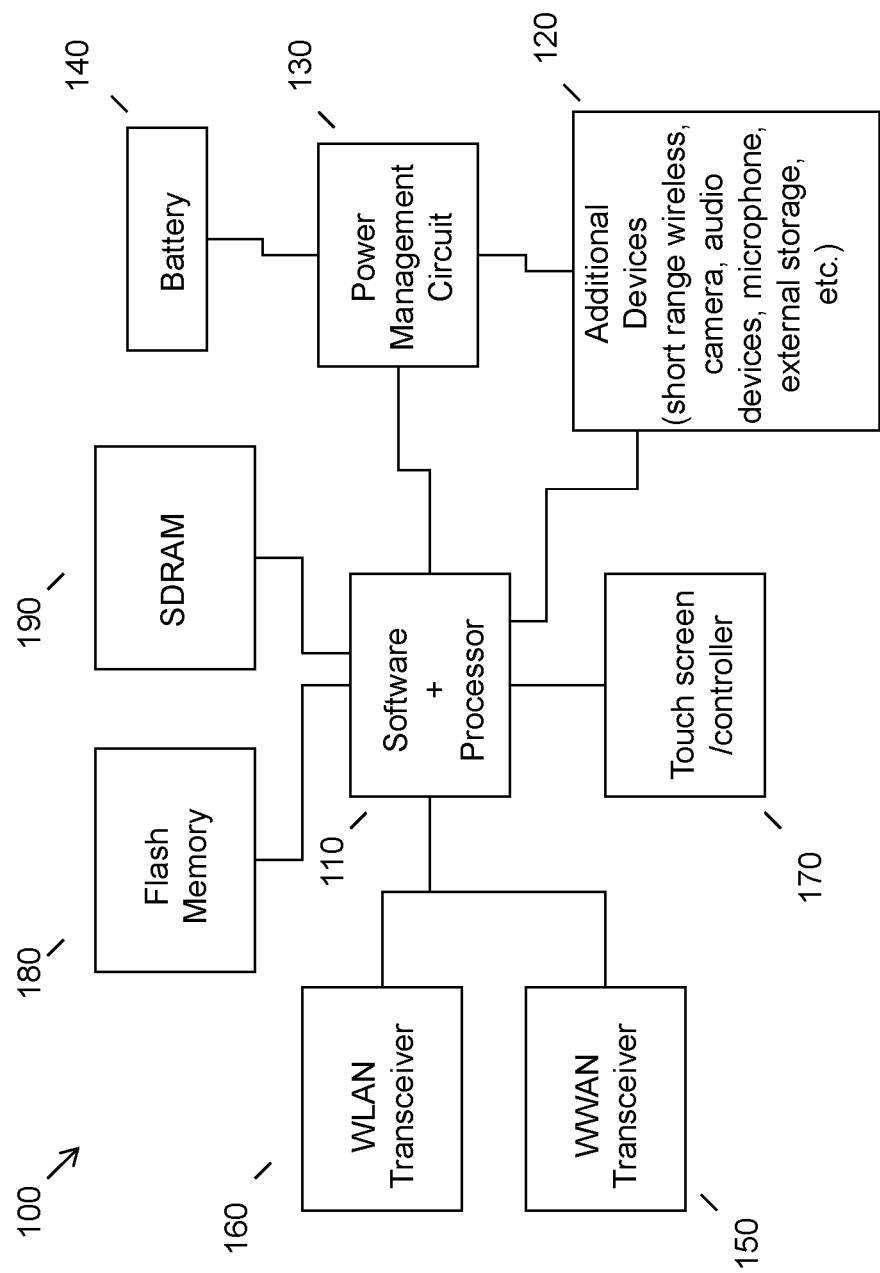
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When an organization and/or an individual has a practice of recording communications, it is common for a plurality of recorded communications to become messy and hard for a user to track what information is discussed in which communication and which recording. An individual can end up spending an extended amount of time simply trying to locate a recording where a particular topic was discussed, and may spend additional time attempting to determine when a topic is specifically discussed on the recording. Additionally, when a recorded communication includes a plurality of participants on a communication, determining when one of the plurality of users is speaking on the topic can be hard to decipher because of multiple participants speaking at the same time, repeating of information on a topic between participants, and/or the like. The commotion included with multiple participants present on a communication increases a level of difficulty when determining when a topic is discussed.

In an attempt to alleviate some of the stress when attempting to determine when a topic was discussed, and potentially which participant on a communication is discussing a topic from a specified amount of time, a system may use a transcription system to transcribe a conversation within the recorded communication in a text form. Providing the communication in a text form may output each piece of dialogue onto a physical medium to be read by the user, and can then be searched based on keywords to assist in locating when a topic was discussed between the participants. However, when transcribing the communication, the outputted text will lack associations between a topic and a user who is speaking, and will additionally lack a conversational flow dynamic that may be instrumental in understanding a topic being discussed. For example, a keyword search may locate a specific keyword within a transcribed text, but will not include the context in which the keyword was provided, which can cause a user to miss an important aspect associated with a topic that was being discussed.

Additionally, or alternatively, a communication may be a video call that includes the sharing of image data. A recording can capture this information. However, information presented on a display to the user during the communication will not be aligned and/or broken down by topic in the transcription. What is needed is a system that can produce a map for a recorded communication that includes an identification of a participant speaking and the topic in which they are speaking on, and thereafter providing a range of time within a communication associated with the participant speaking on the identified topic.

Accordingly, the described system and method provides a technique for producing a map for a recorded communication describing and identifying topics discussed during the communication and identifying a participant speaking on a determined topic for an amount of time by utilizing a communication mapping system. The communication mapping system obtains a recorded communication between two or more participants, and may then track when one of the participants is communicating. While the participant is communicating, the communication mapping system may identify a topic of the communication and track an amount of time the participant speaks on the topic. The collected recorded communication data may then be used to produce a map identifying the content of the recorded communication, for example, by identifying at least one topic within the communication, an amount of time associated with a topic within the recorded communication, and/or a participant speaking on a topic present in the recorded communication. This mapping can then be searched by a user to find the particular topic, participant speaking, and/or the like, and then user can then access the recording at the identified point to listen or watch the recorded content to capture the additional information that is provided in a recording that is not provided by a transcription.

Therefore, a system provides a technical improvement over traditional methods for identifying topics of a communication and associating a user speaking on a topic to a range of time within the communication, by utilizing natural language processing techniques in combination with the communication mapping system. The described system and method utilize modern audio-processing techniques along with a machine-learning model within the communication mapping system to produce a map describing topics within the recorded communication. An illustration describing the map may then provide a participant and/or any other user in possession of the map of the recorded communication, with an outline of at least one topic discussed and an association of a user to the amount of time the user speaks on the at least one topic. Thus, the communication mapping system described herein provides an improvement over traditional methods that rely on transcribing an audible communication into a transcript.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and/or the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
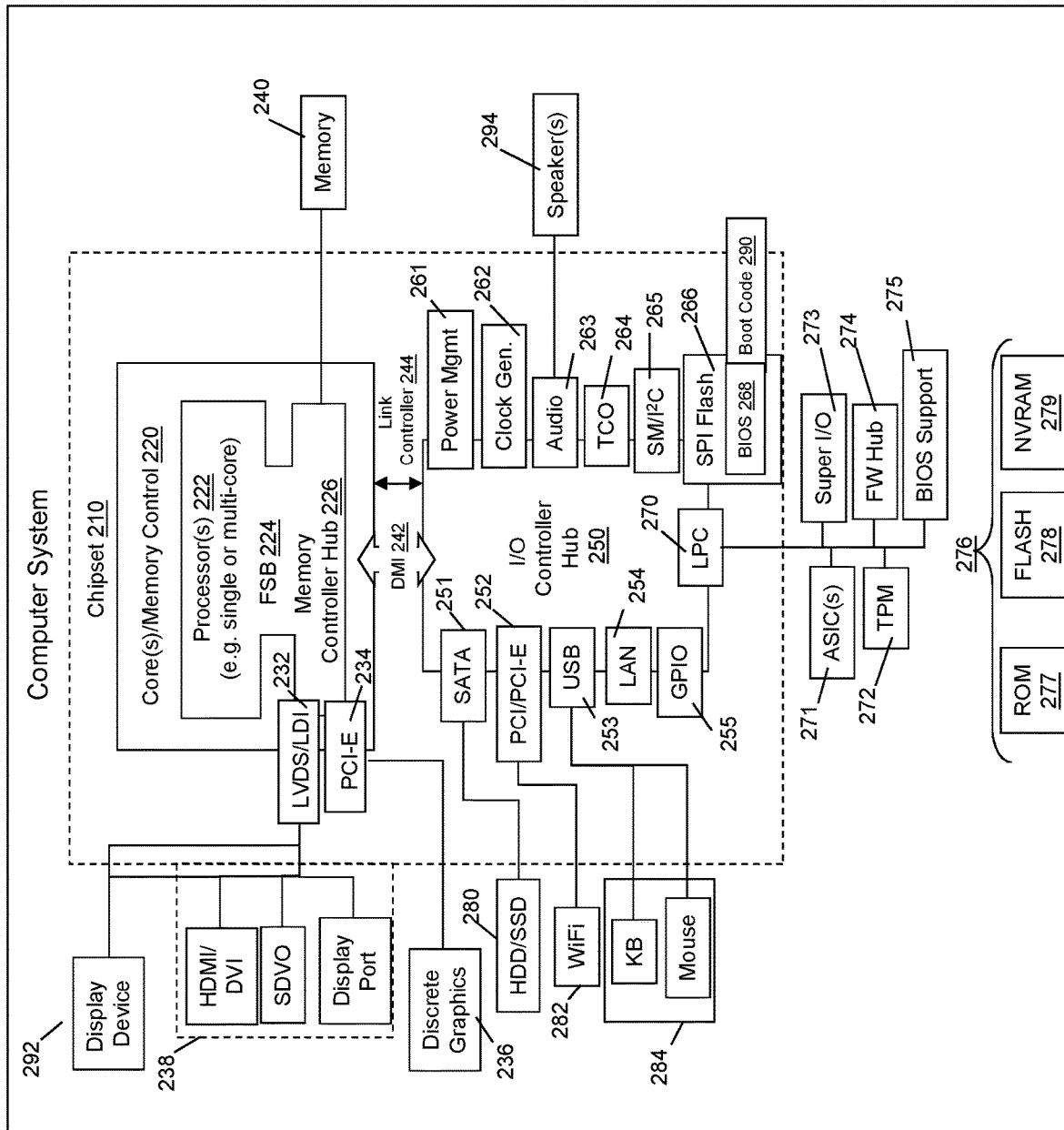
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that tracks topics and users in a recorded communication and/or produces a map from an obtained recorded communication. For example, the circuitry outlined in FIG. 1 may be implemented in a tablet or smart phone embodiment, whereas the circuitry outlined in FIG. 2 may be implemented in a personal computer embodiment.

Figure 3:
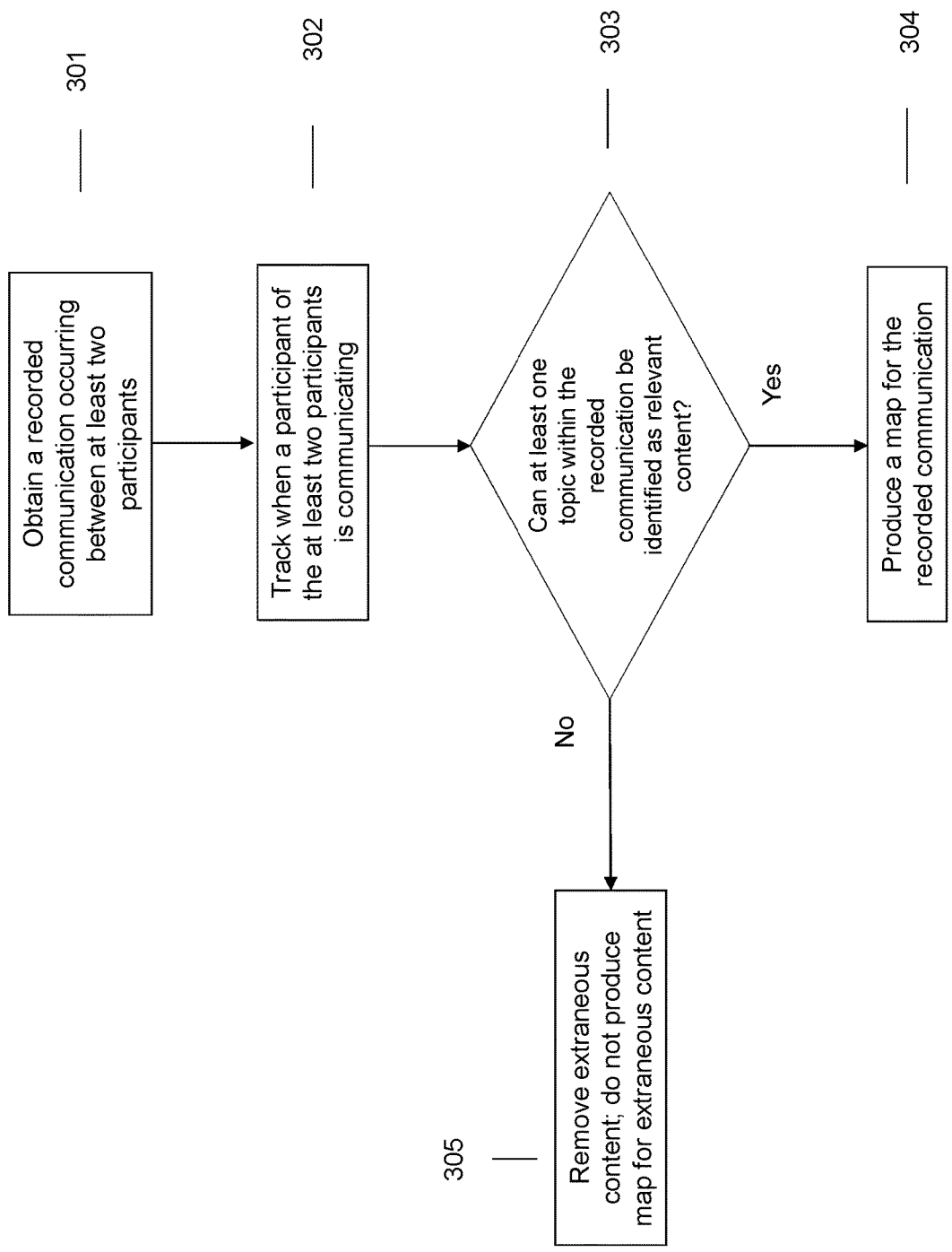
FIG. 3 illustrates an example method for producing a map for a recorded communication based on at least one topic discussed during the communication.

FIG. 3 illustrates an example method for producing a map for a recorded communication based on at least one topic discussed during the communication. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to dynamically produce a map of a recorded communication. Additionally, the communication mapping system includes modules and features that are unique to the described system.

The communication mapping system may be implemented on a single information handling device or a system of devices. Generally, the information handling device utilized by the user to participate in a recorded communication (e.g., an audio call, a video call, etc.) will be a traditional user device, for example, a smart phone, cellular phone, laptop computer, tablet, smart watch, and/or other devices that have the ability to participate in a communication. Thus, the information handling device may include at least one processor permitting the utilization of the information handling device for accessing a communication medium between at least two participants present on a recorded communication.

The communication mapping system may run in the background of an information handling device and may be activated when the device is activated. Additionally, or alternatively, the system may be activated when an application associated with a communication-medium (e.g., phone call application, video-conferencing application, etc.) is activated, detected, or otherwise opened. The system may also activate the system upon the acquiring of a recorded communication. In this case, the communication mapping system may not be activated until the recorded communication is obtained.

Once the communication mapping system is activated on a device, the system may be utilized throughout the process of producing a map for a recorded communication. Continued use of the communication system in producing such a map for a recorded communication may train the device in determining a topic present in the conversation, identifying the participant who is discussing the at least one topic for a range of time within the recorded communication, and thereafter producing a map describing the information identified within the recorded communication obtained. To perform the steps present in the communication mapping system and in order to accurately depict what is discussed between the participants on the recorded communication, the communication mapping system may utilize a neural network, machine-learning model, and/or other learning algorithm, collectively referred to as a machine-learning model for ease of readability. The machine-learning model can be trained utilizing recorded communications previously parsed, and each of its parsed sections identifying the associated topic being discussed, the user or participant discussing the topic, and an amount of time associated with a participant for each topic discussed. In other words, the machine-learning model is given annotated recorded communications where topics, users, and times are already labeled or annotated. These annotated recorded communications are referred to as a training dataset.

Using the training dataset, which may change over time, the machine-learning model learns nuances between participants when communicating and topics within a recorded communication. This results in more accurately identifying a user and the topic(s) in which they are speaking on. For example, the machine-learning model can learn different terms used when initially beginning to discuss a topic, keywords commonly used to identify a user, terms indicating the conclusion of a topic discussion, and other keywords and/or terms a participant may utilize indicative of a required piece of data for producing a map associated with a recorded communication. As information is determined within newly obtained recorded communications and is confirmed or modified, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate.

At 301, the communication mapping system may obtain a recorded communication occurring between at least two participants. A recorded communication is a discussion that has occurred between at least two participants over a type of communication medium (e.g., video conference, telephone call, voice-over-Internet-protocol call, etc.). For example, a communication between three participants may occur over a video-conferencing application. The recorded portion of the recorded communication simply clarifies that the communication information obtained, at 301, provides all the information discussed upon initiating the recording of the communication and until the completion of the call. The system may obtain the recorded communication, at 301, as the communication is ongoing. In other words, as a communication is occurring between participants, the recording of the communication may be supplied to the communication mapping system in real-time, promoting a proactive tracking and identification of the concepts within the communication, as disclosed herein. Additionally, or alternatively, in the system, when obtaining a recorded communication occurring between at least two participants, at 301, the system may obtain a recorded communication subsequent to the completion on the recording in its entirety. Rather than proactively receiving the recorded communication or receiving the recorded communication in real-time as the communication is ongoing, the system may obtain the recorded communication, at 301, upon completion of the communication.

A number of participants present on a recorded communication is dependent on a number of participants a communication medium can support. The communication mapping system utilized after the obtaining the recorded communication, at 301, does not limit a number of participants that may be thereafter identified. Additionally, in the system, how a communication mapping system obtains a recorded communication, at 301, is intended to be non-limiting. For example, in the system, the recorded communication can be obtained by receipt of a recorded communication file, real-time acquisition of the recorded communication through a relationship between the communication medium and the communication mapping system, manual upload of a recorded communication from an external storage device, and/or the like.

After obtaining the recorded communication occurring between at least two participants, at 301, the communication mapping system may then move forward with tracking when a participant of the at least two participants is communicating, at 302. Since obtainment of the communication may occur in real-time, the tracking may also occur in real-time as the communication is ongoing. Since there are at least two participants present in each recorded communication, the system at 302 may track when each of these participants is speaking, either by parsing a recorded communication or tracking the participants while the communication is ongoing.

In tracking when a participant is communicating, the system may utilize a voice recognition technique. Recognition of a voice on the recorded communication may be the most effective method in determining which of the at least two participants is speaking. Voice data associated with a participant may be learned, and stored over time, by use of the machine-learning model within the recorded communication. The machine-learning model may intake each voice present on each recorded communication uploaded and identify characteristics of each voice in order to determine who is speaking and when that person is speaking. As mentioned previously, as the machine-learning obtains more recorded communications, accuracy surrounding the tracking of a participant communicating will increase. Additionally, or alternatively, the characteristics of each participant's voice (e.g., tone, frequency, speed, impediments, etc.) may be saved in an associated user profile and located on an accessible storage device. Such a user profile may include the information needed to accurately track, at 302, when a participant of the at least two participants is communicating.

When tracking when a participant is communicating, at 302, the system may first mark a start time for when the user is determined to being speaking. This start point may coincide with the first word a user communicates on the recorded communication. In the system, the communication mapping system may anticipate the tracking, at 302, by use of one or more image capture sensors. In the system, when a video communication medium is being used (e.g., video-conference call), an image capture sensor may recognize build-up and/or an action associated with a user that indicates a user will begin communicating. For example, prior to a user communicating on the recorded communication, the system may detect that the user takes a large breath and/or inhales. This action performed by the user may be stored in an accessible user profile. Additionally, or alternatively, when the recorded communication uses a video communication medium, the system may detect when a camera for the participant is activated and use this activation of a camera as an anticipatory cue to a participant communicating over the communication medium, and thus on the recorded communication.

Upon completion of a user communicating on the recorded communication, the tracking, at 302, may mark an ending time corresponding to when the participant stopped communicating. The system may mark an exact time within the recorded communication for when the participant is determined to stop communicating. Being that the recorded communication is a finite amount of time, the marked starting point and marked ending point associated with a participant communicating must fall within the limits of the overall recorded communication. In the system, an appropriate tracking of a participant communicating must fall with the, for example, 7-minute total recorded communication. It would be inappropriate if the system labels an end point outside, using the example, the 7-minute mark. It should be noted that frequently a participant will start and stop communicating multiple times during a single recorded communication. The system will mark each of these times as individual time ranges so that accurate mapping can be performed later. In other words and for example, if a user speaks twice with a second user speaking between those two times, the system will have two separate time range markings for that user.

While a participant is communicating, and in combination with th, the tracking of the participant, at 302, the system may determine if at least one topic within the recorded communication can be identified, at 303. The communication mapping system may access a storage device and/or database containing a plurality of topics, and may compare identified keywords present within the recorded communication against this plurality of topics stored to determine or identify at least one topic being discussed by a participant. The system may use a natural language processing technique to parse the communication and determine at least one topic being discussed on the recorded communication.

Additionally, or alternatively, a keyword extraction method may be used alongside the natural language processing technique to determine keywords communicated by a participant, and thereafter compare against the keywords associated with a topic present in the database. In the system, when a match is determined between one or more keywords communicated by a participant and at least one of a plurality of stored keywords, a topic of the communication may be determined, at 303. However, when at least one keyword present in the communicating of a participant does not match at least one of the plurality of stored keywords, a topic may not be determined. It should be noted that other topic identification and/or natural language processing techniques may be utilized in determining a topic, for example, information extraction, semantic analysis, syntactic analysis, and/or the like.

Additionally, or alternatively, when identifying at least one topic of the recorded communication, at 303, the system may reference a title of the recorded communication to assist with determining content of the communication. In other words, the system may establish a general topic based upon a title of the communication to assist in determining which content and potential topics discussed during the call are appropriate, relevant, and/or are associated with the topic. Conversely, the system may determine that at least one topic communicated on the recorded communication is unaffiliated with an overarching topic and/or deemed extraneous content. The system may utilize a single title of the recorded communication to determine this overarching topic and/or an agenda of topics may be submitted outlining at least one topic determined to be appropriate and related to the main topic of the recorded communication.

In the system, an identified topic may be determined to be extraneous content. Extraneous content is determined to be unrelated content present in the communication. This unrelated content may be determined, as previously mentioned, by an established title and/or main topic of the recorded communication, and/or an agenda provided alongside the recorded communication outlining appropriate content topics. The communication mapping system may determine extraneous content in multiple forms. For example, the system may determine that a topic of the extraneous content does not match at least one topic deemed appropriate, relevant, and/or associated with an established topic of the recorded communication. For example, when the main topic of the recorded communication is established to be related to baseball statistics, communications provided by one participant associated with an upcoming bridal shower will be considered extraneous content. Additionally, or alternatively, the system may determine extraneous content is present when a communication provided by a user contains illegible communications, for example, continued stuttering, trying over words, and/or the like. Extraneous content is content present within the recorded communication that is not affiliated with an established recorded communication main topic and/or agenda of topics.

The communication mapping system may also track a time within the communication corresponding to the at least one topic identified at 303. As at least one topic is identified in the recorded communication, at 303, the system may track how long the at least one topic is being communicated, when exactly the topic is discussed during the recording, and may associate this amount of time the at lest one topic is being communicated with the participant providing the communication. In other words, the amount of time within the recorded communication that a participant discusses a topic is tracked. When the at least one topic being communicated by a participant is identified to be relevant to the topic of the communication, the content may remain in the recorded communication. However, when a topic of the communication being discussed is identified as being extraneous content, the communication mapping system may remove the extraneous content from the recorded communication. Removal of the extraneous content from the recorded communication may alleviate the recorded communication from containing non-relevant information from the communication; thus, permitting a more user-friendly accessing of relevant information within the recorded communication. In other words, by removing extraneous content from the recorded communication, the recorded communication will contain only information associated with a determined topic and/or agenda of specific topics. The system may, in addition to saving a copy of the recorded communication without the extraneous content, save a copy of the recorded communication in its original form.

The removal of the extraneous content from the recorded communication subsequent to identifying at least one topic within the recorded communication, at 303, may result in a recorded communication in its more relevant, final form. When it is determined that at least one topic identified within the recorded communication is not appropriate and/or is extraneous content, at 303, the system may remove the extraneous content from the recorded communication and not produce a map for the extraneous content at 305.

In the system, when it is determined that at least one topic with the recorded communication is identified as appropriate or relevant content, at 303, the system may produce a map for the recorded communication at 304. As mentioned previously, the appropriate or relevant content of the recorded communication includes at least one topic associated with the main topic of the recorded communication and/or is outlined in an agenda associated with the recorded communication. Producing a map for the recorded communication includes utilizing the information collected from tracking when a participant is communicating on the recorded communication, at 302, and the identified at least one topic discussed by an amount of time identified at 303. In the system, the communication mapping system producing the map for the recorded communication may supply a user of the map with a breakdown of the recorded communication as it relates to topics identified in the recorded communication, times with the communication corresponding to a topic, time within the recorded communication corresponding to a participant communicating, and/or the like.

The communication mapping system may generate an outline of the recorded communication as it relates to the determined topics, participants present, times discussing a topic, times a particular participant was speaking, and/or the like. When breaking down a recorded communication based upon the determined at least one topic present in the recorded communication, the communication mapping system may provide indications within a final recorded communication file outlining where in the recorded communication the topic is communicated. For example, of a 10-minute recorded communication, the system may determine, and thereafter provide an indication on the produced map, that a first topic is discussed from the 1:30-minute mark to the 5-minute mark of the recorded communication, and may also provide that a second topic is communicated from the 5:30-minute mark to the 10-minute mark (or the end of the meeting). The communication system may provide a breakdown of the at least one topic present within the recorded communication over a period of time.

Additionally, or alternatively, the communication system may perform a breaking down and labeling of the recorded communication based upon a participant communicating a topic. In the system, the communication mapping system may provide an indication within the recorded communication labeling where a participant discusses a topic. For example, expanding from the previous example of a 10-minute meeting containing two topics, the communication meeting may identify that participants A and B spoke on topic 1 within the identified first topic timeframe. Further, in the example, the communication mapping system may determine that participants B and C spoke on the second topic within the identified time frame. Producing the map, at 304, may then permit a user of the map to access a portion of the map associated with a topic and participant of the recorded communication, thereby allowing the user the ability to quickly access the desired portion of the recording.

The communication mapping system may produce a map for the recorded communication, at 304, including a breakdown of the appropriate topics present within the recorded communication, an amount of time associated with the topic communicated, and the user communicating the topic for an amount of time within the recorded communication. The system may identify a determined amount of time for a topic based upon the participant communicating the topic and provide an indication within the recorded communication indicating when a specific participant speaks on an identified topic. Additionally, or alternatively, the system may associate a topic that user is identified to have been communicating during the recorded communication with a range of time. In the system, specifics regarding when a user is speaking on a topic, and for how long the user is communicating the topic within a recorded communication, may provide a user of the produce map, at 304, with the ability to quickly located a desired area within the recorded communication.

Further, sub-categories associated with a topic may be provided by the communication system. Sub-categories of the map may include determining specific topics present within an already determined at least one topic of the recorded communication. For example, when the at least one topic communicated in the recorded communication references baseball statistics, sub-categories including, for example, batting average, homeruns, stolen bases, and/or the like, may be marked within the recorded communication, as well. The addition of a sub-categories into the system while producing the map, at 304, may increase an easy to operate and/or user-friendly map describing at least one topic within a recorded communication.

The various embodiments described herein thus represent a technical improvement to conventional methods for identifying topics of a communication and associating a user speaking on a topic to a range of time within the communication by utilizing natural language processing techniques in combination with the communication mapping system. Production of a map for a recorded communication describing topics discussed during the communication and identifying a participant speaking on a determined topic for an amount of time provides a user of the map with the ability to easily and/or quickly locate portions of the recorded communication desired. Rather than relying on traditional methods for identifying topics within a communication, that may take an extended amount of time, the communication mapping system utilizing a machine-learning model may accurately track a participant communicating a topic for an identified amount of time, and mark and/or provide an indication within the recorded communication identifying when the participant is communicating and on what topic the participant is communication. Additionally, the communicating system removes extraneous content from the recorded communication to further enable location of the desired content of the user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    executing a communication mapping system that maps content of a recorded communication between at least two participants, removes extraneous content from the recorded communication, and stores the recorded communication without the extraneous content, wherein the executing communication mapping system maps content using audio-processing circuitry and a trained machine-learning model to identify a participant, to determine when that participant is communicating, and to determine content of that participant's communication;
    obtaining, at the communication mapping system, the recorded communication occurring between at least two participants;
    tracking, using the communication mapping system, when a participant of the at least two participants is communicating;
    identifying, using the communication mapping system and while the participant is communicating, at least one content topic of the recorded communication, wherein the identifying comprises tracking a time within the recorded communication corresponding to the at least one content topic and establishing a general topic comprising the at least one content topic of the recorded communication, wherein the establishing the general topic comprises labeling each of the at least one content topic of the recorded communication based upon the participant of the at least two participants communicating the at least one topic content during the recorded communication and wherein the recorded communication comprises a plurality of general content topics, wherein communication mapping system utilizes a keyword extraction method to determine a relevancy of the at least one content topic present within the recorded communication; and
    producing, from the tracking and the at least one content topic, a map for the recorded communication, wherein the map identifies content topics of the recorded communication, times within the recorded communication corresponding to the content topics, and times within the recorded communication corresponding to a participant communicating, wherein the producing the map comprises permitting access to a portion of the map corresponding to the at least one content topic and the participant, wherein the permitting the access to the portion of the map comprises utilizing a search feature of the communication mapping system that can access the at least one content topic from the plurality of general content topics of the recorded communication;
    further comprising identifying extraneous content within the recorded communication, removing the extraneous content from the recorded communication and storing the recorded communication without the extraneous content to storage device, wherein the identifying the extraneous content is unrelated is based upon the keyword extraction method of the communication mapping system;
    wherein the extraneous content comprises communication content unrelated to at least one general content topic of the recorded communication.

2. The method of claim 1, wherein the obtaining comprises obtaining the recorded communication as the communication is occurring and wherein the tracking occurs while the communication is occurring.

3. The method of claim 1, wherein the tracking comprises marking a starting time corresponding to when the participant began communicating and marking an ending time corresponding to when the participant stopped communicating.

4. The method of claim 1, wherein the identifying extraneous content comprises identifying a topic of the communication content of the extraneous content does not match topics of other communication content of the recorded communication.

5. The method of claim 1, wherein the identifying extraneous content comprises identifying an agenda of the recorded communication and identifying the communication content of the extraneous content does not correspond to the agenda.

6. The method of claim 1, wherein the producing the map comprises parsing the communication into sub-categories associated with the determined at least one topic and marking the map with the sub-categories.

7. The method of claim 1, wherein the producing the map comprises generating an outline of the recorded communication.

8. The method of claim 1, wherein the producing the map for recorded communication comprises providing an indication within a final communication file outlining where in the recorded communication each of the plurality of general topics are communicated.

9. The method of claim 8, wherein the final communication file outlining the recorded communication comprises a breakdown of the general topic within the recorded communication;
wherein the general topic of the recorded communication comprises the at least one topic identified by the communication mapping system.

10. The method of claim 1, wherein the identifying the at least one topic of the recorded communication comprises identifying at least one sub-category of the at least one topic of the recorded communication.

11. An information handling device, the information handling device comprising:
a processor;
a memory device that stores instructions that when executed by the processor, causes the information handling device to:
execute a communication mapping system that maps content of a recorded communication between at least two participants, removes extraneous content from the recorded communication, and stores the recorded communication without the extraneous content, wherein the executing communication mapping system maps content using audio-processing circuitry and a trained machine-learning model to identify a participant, to determine when that participant is communicating, and to determine content of that participant's communication
obtain, at the communication mapping system, the recorded communication occurring between at least two participants;
track, using the communication mapping system, when a participant of the at least two participants is communicating;
identify, using the commination mapping system and while the participant is communicating, at least one content topic of the recorded communication, wherein to identify comprises tracking a time within the recorded communication corresponding to the at least one content topic and establishing a general topic comprising the at least one content topic of the recorded communication, wherein the establishing the general topic comprises labeling each of the at least one content topic of the recorded communication based upon the participant of the at least two participants communicating the at least one topic content during the recorded communication and wherein the recorded communication comprises a plurality of general content topics, wherein communication mapping system utilizes a keyword extraction method to determine a relevancy of the at least one content topic present within the recorded communication; and
produce, from the tracking and the at least one content topic, a map for the recorded communication, wherein the map identifies content topics of the recorded communication, times within the recorded communication corresponding to the content topics, and times within the recorded communication corresponding to a participant communicating, wherein to produce the map comprises permitting access to a portion of the map corresponding to the at least one content topic and the participant, wherein the permitting the access to the portion of the map comprises utilizing a search feature of the communication mapping system that can access the at least one content topic from the plurality of general content topics of the recorded communication; further comprising identifying extraneous content within the recorded communication, removing the extraneous content from the recorded communication and storing the recorded communication without the extraneous content to storage device, wherein the identifying the extraneous content is unrelated is based upon the keyword extraction method of the communication mapping system;
wherein the extraneous content comprises communication content unrelated to at least one general content topic of the recorded communication.

12. The information handling device of claim 11, wherein the obtaining comprises obtaining the recorded communications as the communication is occurring and wherein the tracking occurs while the communication is occurring.

13. The information handling device of claim 11, wherein the tracking comprises marking a starting time corresponding to when the participant began communicating and marking an ending time corresponding to when the participant stopped communicating.

14. The information handling device of claim 11, wherein the identifying the extraneous content comprises identifying a topic of the communication content of the extraneous content does not match topics of other communication content of the recorded communication.

15. The information handling device of claim 11, wherein the identifying extraneous content comprises identifying an agenda of the recorded communication and identifying the communication content of the extraneous content does not correspond to the agenda.

16. The information handling device of claim 11, wherein the producing the map comprises parsing the communication into sub-categories associated with the determined at least one topic and marking the map with the sub-categories.

17. The device of claim 11, wherein to produce the map for the recorded communication comprises providing an indication within a final communication file outlining where in the recorded communication each of the plurality of general topics are communicated.

18. The device of claim 17, wherein the final communication file outlining the recorded communication comprises a breakdown of the general topic within the communication;
wherein the general topic of the recorded communication comprises the at least one topic identified by the communication mapping system.

19. The device of claim 11, wherein to identify the at least one topic of the recorded communication comprises identifying at least one sub-category of the at least one topic of the recorded communication.

20. A product, the product comprising:
a computer-readable storage device that stores executable code that, when executed by the processor, causes the product to:
obtain, at the communication mapping system, a recorded communication occurring between at least two participants;
track, using the communication mapping system, when a participant of the at least two participants is communicating;
identify, using the communicating mapping system and while the participant is communicating, at least one content topic of the recorded communication, wherein to identify comprises tracking a time within the recorded communication corresponding to the at least one content topic and establishing a general topic comprising the at least one content topic of the recorded communication, wherein the establishing the general topic comprises labeling each of the at least one content topic of the recorded communication based upon the participant of the at least two participants communicating the at least one topic content during the recorded communication and wherein the recorded communication comprises a plurality of general content topics, wherein communication mapping system utilizes a keyword extraction method to determine a relevancy of the at least one content topic present within the recorded communication; and produce, from the tracking and the at least one content topic, a map for the recorded communication, wherein the map identifies content topics of the recorded communication, times within the recorded communication corresponding to the content topics, and times within the recorded communication corresponding to a participant communicating, wherein to produce the map comprises permitting access to a portion of the map corresponding to the at least one content topic and the participant, wherein the permitting the access to the portion of the map comprises utilizing a search feature of the communication mapping system that can access the at least one content topic from the plurality of general content topics of the recorded communication;

further comprising identifying extraneous content within the recorded communication, removing the extraneous content from the recorded communication and storing the recorded communication without the extraneous content to storage device, wherein the identifying the extraneous content is unrelated is based upon the keyword extraction method of the communication mapping system;

wherein the extraneous content comprises communication content unrelated to at least one general content topic of the recorded communication.

* * * * *